3,122,409
PROCESS FOR DYEING OR PRINTING STRUCTURES OF OLEFINES OF LOW MOLECULAR WEIGHT
Klaus J. Bardt, Quebec, Quebec, Canada, assignor to Ciba Limited, Basel, Switzerland, a company of Switzerland
No Drawing. Filed Sept. 5, 1961, Ser. No. 136,162
Claims priority, application Switzerland Sept. 9, 1960
4 Claims. (Cl. 8—34)

It is known that structures of high polymers of olefines of low molecular weight, such as ethylene or propylene, have many advantageous properties. These high polymers have been used for the manufacture of textile fibers, and it seems that for this purpose polypropylene, by virtue of its higher softening point, has certain advantages over polyethylene. The chemical resistance of these polyolefines, however desirable it may otherwise be, entails the disadvantage that no methods of dyeing polyethylene and polypropylene have yet been developed equal to those known for dyeing other fully synthetic fibers, such as those of polyacrylonitrile, polyethylene terephthalate or polyamides. Methods suggested for spin-dyeing such fibers are inapplicable when it is industrially necessary to dye the manufactured goods.

The present invention is based on the observation that structures, more especially textile fibers, of polymers of olefines of low molecular weight, more especially polypropylene, can be dyed or printed by applying vat dyestuffs thereto in a finely dispersed form from an aqueous medium and then fixing the dyestuffs on structures by the action of heat.

In view of the fact that up to the present it was quite impossible to dye fibers of practically pure polypropylene, the success of the present process is extremely surprising and of industrial importance. Polypropylene fibers have been prepared which contain such admixtures or are so changed in another way that they may be more easily dyed than fibers of polypropylene alone. For such modified polypropylene fibers the present process may, of course, also be used. Such a modification of the consistency of the fiber always entails, though, an undesirable change in the valuable properties of the polypropylene fibers, so that it must be considered as a special success that also unmodified polypropylene fibers can be dyed by the present process.

The vat dyestuffs to be used in the process of this invention may belong, for example, to the anthraquinoid series among which dimethoxydibenzanthrone is especially advantageous. Vat dyestuffs of the indigoid series such, for example, as tetrabromindigo, can also be used with advantage. Many dyestuffs of the thioindigoid series yield valuable results, for example, unsubstituted thioindigo or thioindigo substituted in a variety of ways, including naphththioindigoid dyestuffs.

In some cases it is of advantage to carry out the dyeing in the presence of an emulsion of an organic solvent immiscible with water, for example, in the presence of a small proportion of a high boiling solvent, such as orthodichloro-benzene or a high boiling hydrocarbon. If desired, such emulsions may be prepared in the dyebath itself by stirring with a suitable stirring means a mixture of such a water-immiscible solvent and a suitable emulsifier into the dye liquor.

In general it is of advantage not to use the vat dyestuffs as such, but in the form of their acid leuco compounds which are sparingly soluble to insoluble in water, that is to say, in the form of the so-called vat acids. If desired, only a part of the vat dyestuff used may be in the reduced form while the remainder is present in the dyebath in the unreduced form. With many vat dyestuffs of the indigoid and thioindigoid series it is possible to produce a fine dispersion of the vat acid in the dyebath by reacting the vat dyestuff with a reducing agent under conditions such as to avoid conversion of the vat acid into a soluble salt thereof. As reducing agents there may be used those which are generally used for vat dyestuffs, such as sodium hydrosulfite, thiourea dioxide, and more especially the sodium hydroxyethane sulfinate (marketed under the trade name Rongal A) which has recently been introduced. The use of a reducing agent that is more stable than sodium hydrosulfite at raised temperatures may be of advantage in view of the dyeing conditions referred to below. Apart from the conventional reducing agents, there may be used under certain conditions less active reducing agents, such as glucose, degradation products of starch, and the like.

A fundamentally different method of using vat acids, which is in itself known, is to precipitate the vat acid from an alkaline vat solution with the aid of a suitable acid, such as a mineral acid, or more especially a lower fatty acid, such as acetic acid. It may be of advantage to carry out the precipitation in the presence of a protective colloid or a substance having a similar action, in order to produce a fine dispersion.

The process of the invention is especially suitable for dyeing by the so-called exhaustion method, in which the ratio dyebath to goods to be dyed is at least about 7:1. To produce more level dyeings it may be of advantage to use a dyeing method in which the goods to be dyed are kept immersed in the dye liquor throughout the dyeing operation. This is the case, for example, with the known dyeing machines used for dyeing loose fibers or cross-wound cakes in which the dye liquor is kept circulating, and the direction of circulation may be repeatedly reversed.

There may also be used dyeing methods and printing methods in which the ratio of dye liquor or thickened printing paste to the substream to be dyed is substantially lower.

With conventional dyeing methods, in which the ratio of liquor to goods is 7:1 or considerably higher, it is in some cases possible to obtain advantageous results by carrying out the fixation by raising the temperature to at least about 70° or, better still, to 90 to 100° C. In some cases the goods may be entered into a previously heated dye liquor, or the dyebath may be raised to the requisite temperature in a relatively short time. At temperatures of about 90° to 100° C. the degree of fixation attainable is in some cases reached within as short a time as about 20 minutes. When the vat dyestuff is used in the leucoform, it is of advantage, if desired, after rinsing the dyed material, to subject it to oxidation, advantageously also at a raised temperature. In some cases it is desirable for improving the fastness properties to rinse the dyed goods in order to remove any unfixed dyestuff therefrom and, if desired, to subject it to an energetic treatment with a detergent or cleansing agent, for which purpose there may be used the conventional soap-like detergents or non-ionic detergents.

By the process of the invention dyeings of good fastness to light and washing are obtained.

The following examples illustrate the invention, the parts and percentages being by weight unless otherwise stated, and the relationship of parts by weight to parts by volume being the same as that of the kilogram to the litre:

*Example 1*

0.8 part of 5:7:5′:7′-tetrabromindigo is dispersed in a solution of 0.5 part of sodium N-benzyl-μ-heptadecyl-benzimidazole disulfonate and, if desired, 0.2 to 0.5 part of sodium ethylene diamine tetraacetate, in 20 to 40 parts of water. 6 parts by volume of a mixture of about 75% of ortho-dichlorobenzene and about 25% of an emulsifier, advantageously ammonium butyl naphthalene sulfonate, are added, if desired in admixture with a small amount of sodium N-benzyl-μ-heptadecyl-benzimidazole disulfonate and 10 parts of Rongal A (sodium hydroxyethane sulfinate), and the dyebath is made up with water to 500 to 1000 parts (depending on the size of the apparatus used).

In a dyeing apparatus 40 parts of loose polypropylene fibers are dyed by raising the temperature rapidly, for example in the course of 20 minutes, from 50° C. to 90–97° C., and dyeing is carried on for 20 minutes at that temperature. The material is then rinsed, and oxidised for 20 minutes at about 90° C. in a fresh bath with a solution of 7 parts of sodium perborate and 0.5 part of acetic acid of 40% strength and 2 parts of a non-ionic wetting agent (for example, octyl phenol or nonylphenol condensed with 9 mols of ethylene oxide) in 500 to 1000 parts of water. The material is again rinsed in a fresh bath containing a non-ionic detergent (see above). A blue dyeing is obtained which has good fastness to washing and light.

*Examples 2 to 8*

The dyestuffs given below are used in the manner described in Example 1, whereby the tints given in the third column of the following table are obtained.

| Example No. | Dyestuff | Tint of dyeing |
|---|---|---|
| 2 | A mixture of 1 part of 6:6′-Diethoxythioindigo with 4 parts of 4:4′-dimethyl-6:6′-dichlorothioindigo. | red. |
| 3 | 2:1:2′:1′-naphththioindigo | brown. |
| 4 | 4:4′-dimethyl-6:6′-dichlorothioindigo | pink. |
| 5 | 5:5′-dichloro-7:7′-dimethylthioindigo | red. |
| 6 | [structure: thioindigo derivative with CH₃ and Cl substituents] | bordeaux. |
| 7 | [structure: dichloro/bromo thio-NH compound] | grey. |
| 8 | dimethoxy dibenzanthrone | green. |

What is claimed is:

1. A process for dyeing polypropylene fibers wherein an acid leuco compound of a vat dyestuff is applied to said fibers as a fine dispersion from an aqueous medium and the dyestuff is fixed thereon by the action of heat.

2. A process according to claim 1 wherein the aqueous medium is an aqueous emulsion of a water-immiscible organic solvent of a boiling point above 100° C.

3. A process according to claim 1 wherein the aqueous medium is insufficiently alkaline for dissolving the acid leuco compounds of vat dyestuffs.

4. A process according to claim 1 wherein the polypropylene fibers are kept immersed in the dye liquor during the dyeing operation.

References Cited in the file of this patent

UNITED STATES PATENTS

| | | |
|---|---|---|
| 2,695,832 | Mautner | Nov. 30, 1954 |
| 2,774,647 | Mecco et al. | Dec. 18, 1956 |
| 2,774,648 | Mecco et al. | Dec. 18, 1956 |
| 3,023,072 | Dabrowski | Feb. 27, 1962 |